United States Patent
Hennige et al.

(10) Patent No.: US 7,759,009 B2
(45) Date of Patent: Jul. 20, 2010

(54) PYROGENIC OXIDIC POWDER, PRODUCTION THEREOF AND USE THEREOF IN A SEPARATOR FOR AN ELECTROCHEMICAL CELL

(75) Inventors: Volker Hennige, Dülmen (DE); Christian Hying, Rhede (DE); Gerhard Hörpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 1418 days.

(21) Appl. No.: 10/534,952

(22) PCT Filed: Nov. 5, 2003

(86) PCT No.: PCT/EP03/12309

§ 371 (c)(1),
(2), (4) Date: May 16, 2005

(87) PCT Pub. No.: WO2004/048269

PCT Pub. Date: Jun. 10, 2004

(65) Prior Publication Data

US 2006/0003230 A1    Jan. 5, 2006

(30) Foreign Application Priority Data

Nov. 26, 2002 (DE) .............................. 102 55 124

(51) Int. Cl.
 *H01M 2/16* (2006.01)
 *B32B 5/16* (2006.01)
 *B05D 7/00* (2006.01)
(52) U.S. Cl. .............. 429/247; 429/251; 429/252; 428/402; 427/212
(58) Field of Classification Search .......... 429/247, 429/251, 252; 428/402; 427/212
See application file for complete search history.

(56) References Cited

U.S. PATENT DOCUMENTS 6,475,677 B1 * 11/2002 Inda et al. ................. 429/304
6,893,621 B2 * 5/2005 Fukuoka et al. ............. 423/332

FOREIGN PATENT DOCUMENTS

| DE | 40 00 608 A1 | 7/1990 |
| DE | 44 46 995 A1 | 6/1995 |
| DE | 198 19 752 A1 | 11/1999 |
| GB | 227040 | 5/1924 |
| JP | 61077621 A | 4/1986 |
| JP | 2001141693 A | 5/2001 |
| WO | WO 9957161 | 11/1999 |

OTHER PUBLICATIONS

Chen, Gang et al., Research on the Synthesis and Reaction Mechanism of Sub-Micron LiAlO2 Powders, Journal, Feb. 2002, pp. 1-7, vol. 18, No. 2, Institute of composite Materials, Shanghai Jiaotong University, Shanghai, China.
Li Naichao et al., Preparation of LiAlO2 Used as Separator Material in Molten Carbonate Fuel Cells, Journal, Apr. 1997, pp. 1-10, vol. 12, No. 2, Dalian Institute of Chemical Physics, Chinese Academy of Sciences, Dalian, China.
Besenhard, J. O., "Handbook of Battery Materials," 1999, pp. 47-55, 245-246, 554-563, VCH-Verlag, Weinheim, Germany.
Kumar, Binod et al., "Composite Electrolytes for Lithium Rechargeable Batteries," Journal of Electroceramics, 2000, pp. 127-139, vol. 5, Issue 2, Kluwer Academic Publishers, The Netherlands.

* cited by examiner

*Primary Examiner*—Patrick Ryan
*Assistant Examiner*—Julian Mercado
(74) *Attorney, Agent, or Firm*—Smith, Gambrell & Russell, LLP

(57) ABSTRACT

A pyrogenic oxidic powder composed of particles, comprising (i) atoms of an element of groups 3A, 4A, 3B or 4B of the periodic table of the elements, and (ii) oxygen atoms, said particles being characterized by lithium atoms attached to said atoms via an oxygen bridge.

52 Claims, No Drawings

PYROGENIC OXIDIC POWDER, PRODUCTION THEREOF AND USE THEREOF IN A SEPARATOR FOR AN ELECTROCHEMICAL CELL

The present invention relates to a pyrogenic oxidic powder, processes for producing it, the use of the pyrogenic oxidic powder for producing a separator for an electrochemical cell, the use of such a separator for producing an electrochemical cell and also an electrochemical cell which comprises such a separator.

As used herein, electrochemical cell or battery refers to batteries and accumulators (secondary batteries) of any kind, especially alkali metal such as for example lithium, lithium ion, lithium polymer, and alkaline earth metal batteries and accumulators, in the form of high energy or high power systems.

Electrochemical cells comprises electrodes of opposite polarity which are separated from each other by a separator while maintaining ion conductivity.

A separator is conventionally a thin porous electroinsulating material possessing high ion permeability, good mechanical strength and long-term stability to the chemicals and solvents used in the system, for example in the electrolyte of the electrochemical cell. In electrochemical cells, the separator should fully electronically insulate the cathode from the anode. Moreover, the separator has to be permanently elastic and to follow movements in the system, for example in the electrode pack in the course of charging and discharging.

The separator is a crucial determinant of the use life of the system in which it is used, for example the use life of an electrochemical cell. The development of rechargeable electrochemical cells or batteries is therefore influenced by the development of suitable separator materials. General information about electrical separators and batteries may be found for example at J. O. Besenhard in "Handbook of Battery Materials" (VCH-Verlag, Weinheim 1999).

High energy batteries are employed in various applications where the decisive requirement is that a very large amount of electrical energy be available. This is the case for example with traction batteries, but also with auxiliary power systems. The energy density is frequently reported in this field per unit weight [Wh/kg] or per unit volume [Wh/L]. Currently, high energy batteries reach energy densities of 350 to 400 Wh/L and of 150 to 200 Wh/kg. The power levels which such batteries are expected to supply are not that high, so that compromises can be made with regard to the internal resistance. In other words, the conductivity of the electrolyte-filled separator for example does not have to be as large as in the case of high power batteries, for example, so that the way is open to the use of other separator designs.

High energy systems, for instance, can even utilize polymer electrolytes whose conductivity at 0.1 to 2 mS/cm is fairly low. Such polymer electrolyte cells cannot be used as high power batteries.

Separator materials for use in high power battery systems have to have the following properties:

They need to be very thin to ensure low specific space requirements and to minimize the internal resistance. To ensure these low internal resistances, it is important that the separator also has a high porosity. Further, they have to be light in order that a low specific weight may be achieved. In addition, wettability has to be high, since otherwise unwetted dead zones are formed.

Currently used separators consist predominantly of porous organic polymeric films or of inorganic nonwoven web materials, for example webs composed of glass or ceramic materials or else ceramic papers. These are manufactured by various companies. Important producers here are: Celgard, Tonen, Ube, Asahi, Binzer, Mitsubishi, Daramic and others.

There are also advantageous separators composed of porous composites. These comprise a sheetlike flexible substrate which has been provided with a multiplicity of openings and which preferably consists of an electro-nonconductive material having an inorganic coating of ceramic on and in the substrate.

It is known that inorganic compounds are used as fillers in separators for rechargeable lithium batteries (B. Kumar, L. G. Scanlon: "Composite Electrolytes for Lithium Rechargeable Batteries", Journal of Electroceramics 5:2, 127-139, 2000). These inorganic compounds perform various functions in these separators. They influence the glass transition temperature of the polymer electrolytes, improve the dissociation of the conducting salts, raise the transference number of the lithium ions and improve the stability of the protective layer on the lithiated graphite electrode (SEI). Optimum materials for these purposes are lithium salts or glassy lithium compounds such as $Li_3N$ or $Li_{1.3}Al_{0.3}Ti_{1.7}(PO_4)_3$. But these are only obtainable in the form of large particles. True, they can be ground into particles having small average sizes, from 0.2 to 0.5 µm, but are processible with a polymer into an advantageous, very thin separator. But, as well as particles having these small average sizes, grinding will also produce particles having large average sizes from 20 to 50 µm. The particles having these large average sizes cannot be processed with a polymer into an advantageous, very thin separator. They must therefore be separated from the particles having small average primary sizes after grinding. This separation, although possible by various classifying processes, such as hydroclassifying or wind sifting, is very inconvenient and costly. This is because the sieves become relatively easily and rapidly plugged with the particles having large average primary sizes, so that practicable and economical separation is not possible. As well as these disadvantages associated with the separation of particles having large average primary sizes, however, the abovementioned lithium compounds having small average primary sizes have yet further disadvantages. They only have a small specific surface area from about 2 to 5 $m^2/g$. But since the properties of a separator are influenced by the size of the surface areas of the inorganic fillers, these lithium compounds are of limited use in providing advantages to very thin separators for high power systems in particular.

On the other hand, pyrogenic oxidic powders whose particles have very much smaller primary sizes than the lithium compounds described above are used in separators. An example is pyrogenic silica, which is available for example as Aerosil® from Degussa or as Cab-o-sil from Cabot. In addition, there are other pyrogenic oxidic powders of metallic and transition metal oxides. The average primary particle size of these pyrogenic oxidic powders is only a few nanometers (about 7 to 40 nm), whereas their specific surface area is very large at about 50 to 500 $m^2/g$. With regard to primary particle size and specific surface area, these pyrogenic oxidic powders are virtually ideal for use in very thin polymer electrolytes having high conductivity for high power systems. This is because they can easily be finely dispersed in a polymer and processed into advantageous thin separators. However, these pyrogenic oxidic powders have no negative charges on the surface and they do not contain any lithium ions to contribute to charge transportation. In addition, the use of conventional pyrogenic oxidic powders, for example Aerosil, frequently presents problems with any employment in separators for electrochemical cells. These problems are attributable to the relatively high water contents and/or chloride contents of conventional pyrogenic oxidic powders. Conventional pyrogenic oxidic powders have a large specific surface area and so may contain, in their pores, water which is present in unbound form in the powder owing to pore condensation. This water can be removed by drying, for example at elevated temperature. In addition, however, conventional pyrogenic oxidic powders also contain water in the form of partially hydrolyzed oxide, for example silicon dioxide, which is present on the surface of the three-dimensional structure of the oxide. When such a moist oxidic powder is used for producing separators for electrochemical cells, however, only the water in the pores can be removed in a drying step. By contrast, the water which is present in the form of partially hydrolyzed oxide cannot be removed in this way. This leads to problems with the use of the oxidic powder in a separator for an electrochemical cell, since this water reacts with the battery constituents, such as a lithiated electrode or the conducting salt, in exothermic, battery-damaging reactions. The cell as a whole gets very hot as a result, which additionally means that a great deal of energy is consumed in the first charging cycle. This, moreover, leads to a distinctly inferior long-term stability. Also, very severe overheating occurs, especially in the form of hot spots. As a result, the cell may become so severely damaged in the course of the manufacturing process that it is inutile from the start. For this reason, the use of conventional pyrogenic oxidic powders in separators for electrochemical cells is limited. It accordingly is an object of the present invention to provide a new material which is simple to produce and which, especially together with a polymer electrolyte, is simply and easily processible into a separator for an electrochemical cell, and which improves the properties of the separator for an electrochemical cell, especially the transference number of the separator for cations, in an electrochemical cell which utilizes such a separator.

This object is achieved by a pyrogenic oxidic powder composed of particles, comprising
(i) atoms of an element of groups 3A, 4A, 3B or 4B of the periodic table of the elements, and
(ii) oxygen atoms, said particles being characterized by lithium atoms attached to said atoms via an oxygen bridge.

By pyrogenic oxidic powder is meant a finely divided, highly disperse oxide of an element of groups 3A, 4A, 3B or 4B of the periodic table of the elements that is preferably producible by a high temperature hydrolysis such as flame hydrolysis for example.

Proof of the structure, that lithium atoms attached via an oxygen bridge are present, is possible via Raman spectroscopy.

Preferably, the pyrogenic oxidic powder comprises an oxide or mixed oxide of the elements silicon, aluminum or/and zirconium. Most preferably, the pyrogenic oxidic powder of the invention is a finely divided silicon oxide.

In the oxidic powder of the invention, lithium can be present at least on the surface of the particles. But it is also possible that lithium is present in the interior of the particles as well.

The pyrogenic oxidic powder may have a specific surface area from 20 to 500 $m^2/g$ and preferably 50 to 380 $m^2/g$. The specific surface area may be determined by the BET method (DIN 66131).

The high specific surface area which can be achieved with the oxidic powder of the invention is advantageous for improving the surface conductivity and hence an essential property in a separator, the ion conductivity. In addition, the use of the pyrogenic oxidic powder of the invention improves the dissociation of a conducting salt on use in a separator, for example in a polymer electrolyte. Furthermore, when the pyrogenic oxidic powder of the invention is used in a separator for an electrochemical cell, problems which in the case of conventional pyrogenic oxidic powders are attributable to their elevated water contents become a distinctly rarer occurrence.

The reduction in the water content of the pyrogenic oxidic powder of the present invention can be rationalized as follows. The change in the structure of the oxidic powder, which comprises bound water in the form of partially hydrolyzed oxide such as silicon dioxide for example, causes groups having an —M—O—H— structure to be converted into groups having an —M—O—Li— structure, M being an element which forms a ceramic material. M is preferably an element of the group 3A, 4A, 3B or 4B of the periodic table of the elements, generally one of the elements silicon, aluminum and zirconium. In other words, a structure is created that contains lithium atoms attached via oxygen bridges to atoms of one of the elements M. Even if, as a result of adverse circumstances, water were to get to this structure, this would not lead to major problems. True, slight hydrolysis of the structure -M-O—Li— can lead to a group of the structure -M-O—H— being backformed again. This backformed -M-O—H— structure is now in isolation, however. There is no further -M-O—H— group in its neighborhood with which it can combine to release free water, which can damage the constituents of an electrochemical cell in an application as a separator.

In a preferred embodiment of the invention, the pyrogenic oxidic powder is substantially free of $Li_2O$. This has the advantage that it does not attract water when used in separators. $Li_2O$ is hygroscopic.

The pyrogenic oxidic powder of the invention can be produced by the following process comprising the steps of:
(a) providing a mixture comprising
(a-1) a lithium compound,
(a-2) a pyrogenic oxide or a vaporizable compound which forms a pyrogenic oxide in the presence of hydrolyzing and/or oxidizing gases by thermal decomposition, and
(a-3) optionally a solution or dispersion medium, and
(b) reacting said mixture at a temperature of not less than 50° C.

The lithium compound is preferably selected from lithium nitrate, lithium chloride, lithium carbonate, lithium acetate, lithium formate, lithium azide, lithium metal hydrides, for example $LiAlH_4$, which is particularly preferred, lithium alkoxides or organolithium compounds.

In one embodiment of the invention, the mixture comprises a pyrogenic oxide, preferably of the elements silicon, aluminum or zirconium, and a solution or dispersion medium. The pyrogenic oxide is preferably mixed therein with a solution of the lithium compound. The primary particle size of the pyrogenic oxide is preferably from 5 to 100 nm, preferably from 5 to 50 nm and most preferably from 7 to 40 nm. The reaction of the pyrogenic oxide with the lithium compound can be carried out at a temperature from 50 to 450° C. and preferably 100 to 350° C.

The pyrogenic oxide used can be any conventional pyrogenic oxide, for example Aerosil, which is commercially available.

The reaction at elevated temperature may if necessary be followed by a grinding operation as a further process step, if the product obtained in the reaction is insufficiently finely divided, for example for further processing into a separator for an electrochemical cell. However, grinding is a simple and easy way to claim a very finely divided powder having a very homogeneous distribution of the average particle size. This is because the pyrogenic oxide used as a starting material can be easily ground back to a very finely divided powder after the reaction in step (b).

The reaction of the mixture may preferably be carried out by spray drying, for example in a spray dryer. In this case, a particularly finely divided powder can be obtained directly by the reaction, so that there is no need for a further step in the form of a grinding operation. However, should a grinding operation be nonetheless necessary for a specific application, a grinding operation may subsequently be carried out as a further process step.

The process may preferably comprise the use of a fluidized bed reactor and/or of a moving bed reactor.

In a particularly advantageous embodiment of the invention, the number of free OH groups is determined in said pyrogenic oxide and from 0.5 to 1.5 times and preferably from 0.7 to 1.0 times the stoichiometric amount of said lithium compound is used relative to said number of free OH groups. The formation of large amounts of $Li_2O$ is thus avoided. This is because a more than 1.5 times molar excess of the lithium compound relative to the number of OH groups in the support can lead to the formation of $Li_2O$ in major amounts. But, owing to the hygroscopy of $Li_2O$, major amounts of $Li_2O$ should be avoided, or the water content of the powder can rise to a disadvantageous level. It is therefore particularly preferable to use an equimolar amount of lithium compound, or even a deficiency of the lithium compound, relative to the OH groups. But the deficiency should preferably not be less than 0.5 times and more preferably not less than 0.7 times the stoichiometric amount of lithium compound relative to the amount of OH groups. The pyrogenic oxidic powder of the present invention that is obtained in this embodiment is particularly useful for producing a separator for an electrochemical cell. This is because water in a separator for an electrochemical cell leads to problems in the case of cells utilizing alkali or alkaline earth metal ions. The cell as a whole gets very hot as a result, which additionally means that a great deal of energy is consumed in the first charging cycle. This leads to a distinctly inferior long-term stability. Also, very severe overheating occurs, especially in the form of hot spots. As a result, the cell may become so severely damaged in the course of the manufacturing process that it is inutile from the start.

The OH groups are determined by the following method:

A sample which has been dried under reduced pressure at 120° C. (which removed only water, but not OH groups) is introduced as initial charge into a two-necked flask equipped with dropping funnel and a side outlet for gases. To this sample was then gradually added dropwise a solution of 1 mol/L of lithium aluminum hydride in tetrahydrofuran. The reaction of the lithium aluminum hydride with OH groups produces hydrogen (in a stoichiometry of 1 mol of escaping hydrogen per 1 mol of OH groups in the sample). The hydrogen formed is measured by volumetry. The amount of hydrogen formed can thus be converted into the number of OH groups.

In a further embodiment of the invention, the mixture used in the process of the present invention comprises a vaporizable compound which forms a pyrogenic oxide in the presence of hydrolyzing and/or oxidizing gases by thermal decomposition. The reaction is preferably carried out as a high temperature hydrolysis, for example in the form of a flame or plasma hydrolysis. The process operation can be conducted as with the familiar processes of high temperature hydrolysis and in familiar flame and/or plasma hydrolysis apparatus. The HT hydrolysis can be conducted at a temperature which is in particular more than 200° C., preferably more than 800° C. and most preferably more than 1000° C. The temperature of the combustion gases is preferably maintained above the dew point of water.

The vaporizable compound preferably comprises a halide, a hydride, an alkoxide or an organometallic compound. The halide is preferably a chloride, preferably of the elements silicon, aluminum or zirconium, such as $AlCl_3$, $SiCl_4$. Preferably, it is the chloride of silicon. It is further possible to use alkylchlorosilanes of the general formula $R_nSiCl_{4-n}$, where R is an alkyl group and preferably a $C_{1-4}$-alkyl group and n is an integer from 0 to 4, as a vaporizable compound. The alkoxide tetraethyl orthosilicate (TEOS) is also preferred for use as a vaporizable compound. A particularly preferred organometallic compound is zirconium acetylacetonate.

The mixture to be reacted in this process can be mixed before or else in the reactor in which the mixture is reacted. Hydrogen- and/or oxygen-containing gases are present in a preferred embodiment.

The reactor may be a tubular reactor in which the high temperature reaction is carried out.

According to the invention, the pyrogenic oxidic powder of the invention is used for producing a separator for an electrochemical cell. A separator produced using this pyrogenic oxidic powder comprises an enhanced electrical conductivity and an improved transference number for cations, especially lithium ions. Furthermore, an electrochemical cell which utilizes such a separator can be operated on higher load.

The present invention therefore also provides a separator for an electrochemical cell that contains the pyrogenic oxidic powder of the present invention. The separator of the present invention is particularly useful for an electrochemical cell where lithium ions are passed through the separator in operation.

The separator of the present invention preferably comprises a polymer electrolyte, for example polyethylene oxide or polymeric acrylics.

When polyethylene oxide (PEO) is used as a polymer in a separator, the ratio of oxygen to lithium (O:Li) can be in the range from 6:1 to 10:1 and, in a preferred embodiment, 8:1. The lithium is added in the form of a lithium-containing conducting salt. Further lithium can also be added in unknown stoichiometry in the form of the pyrogenic oxidic powder according to the present invention, so that the O:Li ratio can deviate from the preferred ratio of 8:1, since the number of dissociated lithium ions is not precisely known.

The separator of the present invention can contain the pyrogenic metal oxide powder in a preferred embodiment in a fraction of up to 50% by weight, especially up to 30% by weight and most preferably in a fraction of up to about 20% by weight.

But, instead of a polymer electrolyte, the separator may also comprise a porous composite formed from ceramic and from a substrate of nonelectroconductive material, in which case the substrate is preferably flexible. Such a substrate can comprise a nonwoven web, fibers or filaments. More particularly, such a substrate can comprise polymeric fibers which are preferably selected from fibers of polyamide, polyacrylonitrile, polyester, eg polyethylene terephthalate (PET) and/or polyolefin, eg polyethylene (PE) or polypropylene, glass fibers or ceramic fibers.

The present invention also provides for the use of a separator which contains the pyrogenic oxidic powder of the invention for producing an electrochemical cell, especially a lithium battery, lithium ion battery or a lithium polymer battery, each preferably for high energy and/or high power applications.

The present invention further provides an electrochemical cell, especially a lithium battery, lithium ion battery or a lithium polymer battery, comprising one of the above-described inventive separators comprising pyrogenic oxidic powder.

The present invention will now be described with reference to inventive, test and comparative examples.

INVENTIVE EXAMPLES AND TEST EXAMPLES

Inventive Example 1

100 g of Aerosil® 200 are dispersed in 500 ml of water. 3 g of lithium carbonate (from Lancaster) are added. After an hour of homogenization using a magnetic stirrer and a subsequent 5-minute treatment with an Ultraturrax, the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 2

100 g of Aerosil® Ox 50 are dispersed in 500 ml of anhydrous ethanol. 0.8 g of lithium ethoxide (from Lancaster) are added. After an hour of homogenization the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 3

100 g of Aerosil® 150 are dispersed in 500 ml of anhydrous ethanol. 2.3 g of lithium acetate (from Lancaster) are added. After an hour of homogenization the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 4

50 g of Aerosil® 200 are dispersed in 500 ml of anhydrous tetrahydrofuran (from Aldrich). 1.0 g of lithium aluminum hydride (from Lancaster) is added.

After an hour of homogenization the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 5

100 g of aluminum oxide C from Degussa are dispersed in 500 ml of anhydrous ethanol. 0.6 g of lithium ethoxide (from Lancaster) is added. After an hour of homogenization the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 6

100 g of zirconium oxide (VP25 from Degussa) are dispersed in 500 ml of anhydrous ethanol. 0.5 g of lithium ethoxide (from Lancaster) is added. After an hour of homogenization the material is evaporated to dryness in a rotary evaporator. A subsequent treatment in an oven at 350° C. for a period of 5 hours ensures complete reaction of the lithium compound. For further processing, for example as a filler in the form of fine particles for a separator for an electrochemical cell, this partly clumped material still has to be ground.

Inventive Example 7

A mixture of 100 g of Aerosil® 200 in 500 ml of water and 3 g of lithium carbonate (from Lancaster) was thoroughly homogenized and dried in a laboratory spray dryer to 350° C. The ratio of spray air to oxide mix was 1 m³ to 1.5 m³ of hot air at 350° C. to 100 g of dispersion. The treated oxide was collected on a gas filter downstream of the cyclone. The finely divided oxidic powder, unlike the oxides described in inventive examples 1 to 6, does not have to be ground before use.

Inventive Example 8

A mixture of 10 mol of tetraethyl orthosilicate (TEOS) (Dynasilane A) and 1.5 mol of lithium ethoxide (from Lancaster) is metered into the burner flame of an $H_2/O_2$ burner. Lithium-containing silicon dioxide particles having a primary particle size from 7 to 50 nm and a specific surface area from 20 to 300 m²/g are formed in the flame at above 1000° C. The particles are collected using a combination of a cyclone and a gas filter. The finely divided oxidic powder thus obtained can be used without further treatment.

Test Examples

The pyrogenic oxidic powder produced in invention examples 1 to 8 is, if necessary after grinding, mixed in a fraction of 20% by weight into a polyethylene oxide electrolyte having lithium perchlorate conducting salt, the O:Li ratio in the electrolyte being 8:1. This mixture is incorporated as a polymer electrolyte having a pyrogenic oxidic powder filler into a lithium cell consisting of a positive mass of $LiCoO_2$ and a negative mass of graphite. The charging and discharging behavior of this cell shows a very small decrease in capacity after 500 cycles. Even increasing the charging voltage from 4.1 to 4.2 does not harm the battery. The load capacity of the cells can be read off the decrease in total capacity on discharging at 0.5 C. The transference number of the lithium is also measured for the respective electrolyte. The test results obtained with the various pyrogenic oxidic powders are shown in table 1. The comparative examples 1 and 2 are a polymer electrolyte without filler (comparative example 1) and containing 20% by weight of Aerosil® 200 as a filler which does not contain lithium (comparative example 2).

TABLE 1

| Filler (20% by weight) | Li+ transference number | Capacity dischargeable at 0.5 C. as % of total capacity |
|---|---|---|
| Inventive example 1 | 0.68 | 77 |
| Inventive example 2 | 0.59 | 72 |
| Inventive example 3 | 0.76 | 83 |
| Inventive example 4 | 0.82 | 79 |
| Inventive example 5 | 0.89 | 89 |
| Inventive example 6 | 0.65 | 82 |
| Inventive example 7 | 0.89 | 97 |
| Inventive example 8 | 0.81 | 94 |
| Comparative example 1 (without filler) | 0.31 | 57 |
| Comparative example 2 (Aerosil ® 200) | 0.47 | 61 |

What is claimed is:

1. A pyrogenic oxidic powder composed of particles, comprising
   (i) atoms of an element of groups 3A, 4A, 3B or 4B of the periodic table of the elements, and
   (ii) oxygen atoms,
said particles being characterized by lithium atoms attached to said atoms of (i) via an oxygen bridge wherein the pyrogenic oxide is substantially free of $Li_2O$.

2. The pyrogenic oxidic powder of claim 1, comprising an oxide or mixed oxide of the elements silicon, aluminum or/and zirconium.

3. The pyrogenic oxidic powder of claim 1, wherein lithium is present at least on the surface of said particles.

4. The pyrogenic oxidic powder of claim 1, wherein lithium is present in the interior of said particles as well.

5. The pyrogenic oxidic powder of claim 1, having a specific surface area from 20 to 500 $m^2/g$.

6. A process for producing the pyrogenic oxidic powder of claim 1, comprising the steps of:
   (a) providing a mixture comprising
      (a-1) a lithium compound,
      (a-2) a pyrogenic oxide or a vaporizable compound which forms a pyrogenic oxide in the presence of hydrolyzing and/or oxidizing gases by thermal decomposition, and
      (a-3) optionally a solution or dispersion medium, and
   (b) reacting said mixture at a temperature of not less than 50° C. said pyrogenic oxide powder being substantially free of $Li_2O$.

7. A process as claimed in claim 6, wherein said lithium compound is selected from lithium nitrate, lithium chloride, lithium carbonate, lithium acetate, lithium formate, lithium azide, lithium metal hydrides, lithium alkoxides or organolithium compounds.

8. A process as claimed in claim 6, wherein said mixture comprises a pyrogenic oxide of the elements silicon, aluminum or zirconium, and a solution or dispersion medium.

9. A process as claimed in claim 8, wherein said pyrogenic oxide is mixed with a solution of said lithium compound.

10. A process as claimed in claim 8, wherein said pyrogenic oxide has a primary particle size from 5 to 100 nm.

11. A process as claimed in claim 6, wherein said reacting is effected at a temperature from 50 to 450° C.

12. A process as claimed in claim 6, wherein the number of free OH groups is determined in said pyrogenic oxide and from 0.5 to 1.5 times the stoichiometric amount of said lithium compound is used relative to said number of free OH groups.

13. A process as claimed in claim 6 wherein said vaporizable compound comprises a halide, a hydride, an alkoxide or an organometallic compound.

14. A process as claimed in claim 13, wherein said reacting is effected as a high temperature hydrolysis.

15. A process as claimed in claim 13, wherein said high temperature hydrolysis is effected at a temperature of more than 200° C.

16. A process as claimed in claim 13, wherein hydrogen- and/or oxygen-containing gases are present.

17. A pyrogenic oxidic powder obtainable by claim 6.

18. The use of the pyrogenic oxidic powder of claim 1 for producing a separator for an electrochemical cell.

19. A separator for an electrochemical cell, especially for an electrochemical cell where lithium ions are passed through said separator in operation, characterized by said separator containing the pyrogenic oxidic powder of claim 1.

20. A separator as claimed in claim 19, comprising a polymer electrolyte.

21. The use of a separator as claimed in claim 19 for producing an electrochemical cell, especially a lithium battery, lithium ion battery or a lithium polymer battery for high energy and/or high power applications.

22. An electrochemical cell, especially a lithium battery, lithium ion battery or a lithium polymer battery, wherein said cell comprises a separator as claimed in claim 19.

23. A pyrogenic oxidic powder composed of particles, comprising
   (i) atoms of at least one of an element selected from the group consisting of Groups 3A, 4A, 3B and 4B of the Periodic Table of the Elements, and
   (ii) oxygen atoms,
said particles being characterized by lithium atoms attached to said atoms of (i) via an oxygen bridge said pyrogenic oxidic powder being substantially free of $Li_2O$.

24. The pyrogenic oxidic powder of claim 23, comprising an oxide or mixed oxide of at least one of the elements silicon, aluminum and zirconium.

25. The pyrogenic oxidic powder of claim 23, wherein lithium is present at least on the surface of said particles.

26. The pyrogenic oxidic powder of claim 23, wherein lithium is present in the interior of said particles as well.

27. The pyrogenic oxidic powder of claim 23, having a specific BET surface area from 20 to 500 $m^2/g$.

28. The pyrogenic oxides powder of claim 23 which has a specific BET surface area of 50 to 380 $m^2/g$.

29. A separator for an electrochemical cell node from the pyrogenic oxidic powder of claim 23.

30. A separator for an electrochemical cell where lithium ions are passed through said separator in operation, characterized in that said separator containing the pyrogenic oxidic powder of claim 23.

31. The separator as claimed in claim 30, comprising a polymer electrolyte.

32. A method for making an electrochemical cell comprising inserting a separator as claimed in claim 30 into a member selected from the group consisting of a lithium battery, lithium ion battery and a lithium polymer battery.

33. An electrochemical cell, selected from the group consisting of a lithium battery, lithium ion battery or a lithium polymer battery, wherein said cell comprises a separator as claimed in claim 30.

34. A process for producing the pyrogenic oxidic powder of claim 23, comprising:
(a) providing a mixture comprising
(a-1) a lithium compound,
(a-2) a pyrogenic oxide or a vaporizable compound which forms a pyrogenic oxide in the presence of hydrolyzing and/or oxidizing gases by thermal decomposition, and
(a-3) optionally a solution or dispersion medium, and
(b) reacting said mixture at a temperature of not less than 50° C. to form a pyrogenic oxidic powder which is substantially free of $Li_2O$.

35. The process as claimed in claim 34, wherein said lithium compound is selected from the group consisting of lithium nitrate, lithium chloride, lithium carbonate, lithium acetate, lithium formate, lithium azide, lithium metal hydrides, lithium alkoxides, organolithium compounds and mixtures thereof.

36. The process as claimed in claim 34, wherein said mixture comprises a pyrogenic oxide and a solution or dispersion medium.

37. The process according to claim 36, wherein the pyrogenic oxide is of the elements silicon, aluminum or zirconium.

38. The process as claimed in claim 36, wherein said pyrogenic oxide is mixed with a solution of said lithium compound.

39. The process as claimed in claim 36, wherein said pyrogenic oxide has a primary particle size from 5 to 100 nm.

40. The process as claimed in claim 36, wherein said pyrogenic oxide has a primary particle size from 5 to 50 nm.

41. The process as claimed in claim 36, wherein said pyrogenic oxide has a primary particle size from 7 to 40 nm.

42. The process as claimed in claim 34, wherein said reacting is effected at a temperature from 50 to 450° C.

43. The process as claimed in claim 34, wherein said reacting is effected at a temperature from 100 to 350° C.

44. The process as claimed in claim 34, wherein the number of free OH groups is determined in said pyrogenic oxide and from 0.5 to 1.5 times the stoichiometric amount of said lithium compound is used relative to said number of free OH groups.

45. The process as claimed in claim 34, wherein the number of free OH groups is determined in said pyrogenic oxide and from 0.7 to 1.0 times the stoichiometric amount of said lithium compound is used relative to said number of free OH groups.

46. The process as claimed in claim 34, wherein said vaporizable compound comprises a halide, a hydride, an alkoxide or an organometallic compound.

47. The process as claimed in claim 13, wherein said reacting is effected as a high temperature hydrolysis.

48. The process as claimed in claim 46, wherein said high temperature hydrolysis is effected at a temperature of more than 200° C.

49. The process as claimed in claim 46, wherein said high temperature hydrolysis is effected at a temperature of more than 800° C.

50. The process as claimed in claim 46, wherein said high temperature hydrolysis is effected at a temperature of more than 1000° C.

51. The process as claimed in 46, wherein hydrogen- and/or oxygen- containing gases are present.

52. The pyrogenic oxidic powder obtainable by the process of claim 34.

* * * * *